United States Patent
Medlen

(10) Patent No.: US 8,999,478 B1
(45) Date of Patent: Apr. 7, 2015

(54) REMOVABLE OVERLAY PANEL FOR EXISTING GARAGE DOOR

(71) Applicant: Richard L. Medlen, Eugene, OR (US)

(72) Inventor: Richard L. Medlen, Eugene, OR (US)

(73) Assignee: Garageskins, Inc., Albany, OR (US)

( * ) Notice: Subject to any disclaimer, the term of this patent is extended or adjusted under 35 U.S.C. 154(b) by 104 days.

(21) Appl. No.: 13/890,472

(22) Filed: May 9, 2013

Related U.S. Application Data

(60) Provisional application No. 61/741,469, filed on Jul. 20, 2012.

(51) Int. Cl.
| | | |
|---|---|---|
| *E06B 3/70* | (2006.01) | |
| *E04F 13/08* | (2006.01) | |
| *B44C 1/22* | (2006.01) | |
| *B44C 3/00* | (2006.01) | |
| *B32B 7/02* | (2006.01) | |
| *E04F 13/00* | (2006.01) | |
| *E06B 3/48* | (2006.01) | |
| *E06B 1/00* | (2006.01) | |
| *G09F 7/18* | (2006.01) | |

(52) U.S. Cl.
CPC ............... *E06B 3/7001* (2013.01); *B32B 7/02* (2013.01); *E04F 13/0883* (2013.01); *E04F 13/00* (2013.01); *E06B 3/485* (2013.01); *E06B 2003/7044* (2013.01); *E06B 1/006* (2013.01); *G09F 2007/1852* (2013.01); *G09F 7/18* (2013.01); *Y10S 52/04* (2013.01); *B44C 1/22* (2013.01); *B44C 3/005* (2013.01); *E06B 2003/7011* (2013.01)

(58) Field of Classification Search
CPC ............................ E04F 13/088; E04F 13/0883
See application file for complete search history.

(56) References Cited

U.S. PATENT DOCUMENTS

| | | | | | |
|---|---|---|---|---|---|
| 3,853,576 | A | * | 12/1974 | Netznik | 428/202 |
| 4,747,246 | A | * | 5/1988 | Sanborn | 52/506.07 |
| 5,264,062 | A | * | 11/1993 | Ohsumi et al. | 428/464 |
| 5,733,659 | A | * | 3/1998 | Iwakiri et al. | 428/412 |
| 5,863,479 | A | * | 1/1999 | Ohsumi et al. | 264/162 |
| 6,148,896 | A |   | 11/2000 | Pinto et al. | |
| 6,227,278 | B1 | * | 5/2001 | Forsland | 160/107 |
| 6,446,695 | B1 | * | 9/2002 | Forsland | 160/201 |

(Continued)

OTHER PUBLICATIONS

"FAQ—Frequently Asked Questions: Why does my magnet not carry the maximum weight on the wall?" Supermagnete (Jul. 3, 2013) <http://www.supermagnete.de/eng/faq/Why-does-my-magnet-not-carry-the-maximum-weight-on-the-wall>.*

*Primary Examiner* — David Sample
*Assistant Examiner* — Donald M Flores, Jr.
(74) *Attorney, Agent, or Firm* — Hancock Hughey LLP

(57) ABSTRACT

A panel overlay system for embellishing an existing metal multi-panel articulating overhead garage door is disclosed. Plural lightweight panels are removably attached to the panels of the existing garage door with magnets. Each panel comprises an underlayment sheet that provides a relatively rigid structural backing, and thin wood veneer adhesively bonded to the outer-facing major surface of the backing sheet. The veneer includes plural vertical demarcations; when multiple panels are installed the demarcations on adjacent panels align to give the appearance of elongated vertical boards. Vertical and horizontal members are placed at desired positions on the veneer—typically the vertical members are aligned along the side edges of the panel and the horizontal member extends across the middle of the panel so that the entire installation provides the appearance of a garage door typical of the well-known rail and stile carriage house design.

20 Claims, 8 Drawing Sheets

(56) References Cited

U.S. PATENT DOCUMENTS

| | | |
|---|---|---|
| 6,586,085 B1 | 7/2003 | Jella |
| 7,980,012 B2* | 7/2011 | Peterson et al. ............ 40/1.5 |
| 8,561,368 B2* | 10/2013 | Fimbel, III ............... 52/316 |
| 2005/0016694 A1* | 1/2005 | Jella ........................ 160/236 |
| 2005/0055921 A1* | 3/2005 | Vella ........................ 52/311.1 |
| 2008/0166508 A1* | 7/2008 | Edwards ................... 428/411.1 |
| 2009/0107047 A1 | 4/2009 | Magill et al. |
| 2011/0293914 A1* | 12/2011 | Maurer et al. ............ 428/304.4 |
| 2012/0279157 A1* | 11/2012 | Sha ........................... 52/578 |

* cited by examiner

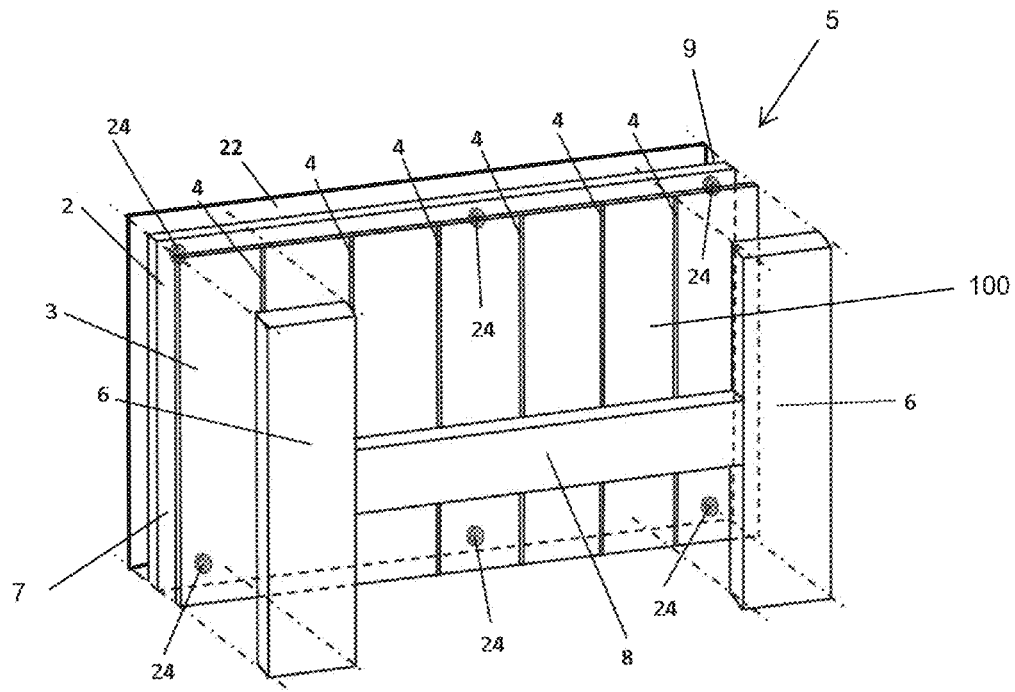
Fig. 1
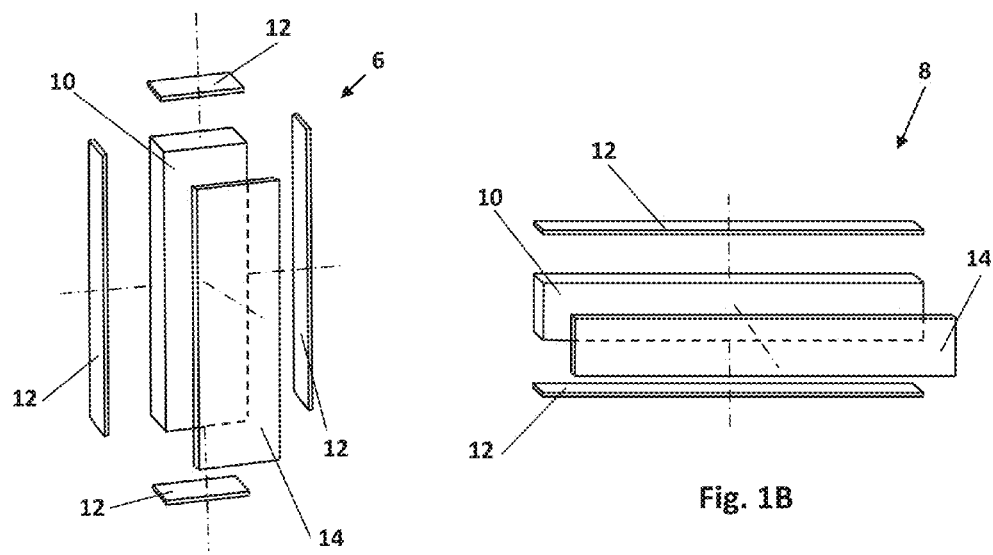
Fig. 1A
Fig. 1B

REMOVABLE OVERLAY PANEL FOR EXISTING GARAGE DOOR

FIELD OF THE INVENTION

This invention relates to apparatus used to embellish a structure's existing garage doors, and more particularly, to lightweight removable overlay panels designed for removable attachment to an overhead multi-panel articulating metal garage door for the purpose of enhancing the appearance of the garage door so that the door has the visual appearance of being made of solid wood in the style of a carriage-house type of door.

BACKGROUND

Products that affordably re-create the appearance of today's luxury home exteriors have been embraced by the home improvement markets. To provide a few examples, manufactured veneer stone creates the look of stacked-stone foundations, stamped-and-stained concrete mimics flagstone pathways, and architectural shingles emulate slate roofs just to name a few. These products are generally used in the embellishment of moderately-priced homes to enhance their exterior appearance, or "curb-appeal," without incurring the increased costs associated with the high-end products that are being mimicked. It is clear that homeowners, realtors, builders and architects are seeking products which can affordably embellish the exterior of lower to medium value homes so that when these products are installed, they create the appearance that a more modest home has features that consumers typically associate with more expensive luxury homes.

With today's shrinking urban and suburban building lots and the desire of many cities and towns to increase urban density, builders have been forced to build structures in closer proximity to the street than was common in the past. As a result, the residential garage door has become a prominent feature of modern lower-to-medium value homes, encompassing as much as forty percent of the street-view elevation of these homes. Such homes have predominantly been built with garage doors comprising a plurality of horizontal panels stacked vertically and connected via hinges, and retracting into the structure on an overhead channel track with spring-loading assistance. To manage costs the panels of these garage doors have generally been manufactured with stamped-steel exterior coverings, which have little to no visual interest. With the prominent position of the garage door in today's homes it would be beneficial to have a product available that allows a user to affordably embellish the appearance of an existing metal articulating panel overhead garage door to simulate the appearance of vintage, solid-wood carriage-style garage doors of the type that are found on much more expensive luxury homes.

In contrast to garage doors built of metal panels, many high end luxury homes are constructed with an overhead articulating multi-panel garage door that raises and lowers via a track and spring method and is made of either solid wood or a combination of metal underlayment with wood overlaid onto the exterior. A carriage style house door of this type is disclosed in U.S. Pat. No. 6,586,085 to Jellá, (2003.) The garage door described by Jellá is manufactured with a plurality of dimensional wood overlays bonded to one another and arranged in patterns that give the appearance that the overhead door is actually a set of vintage solid-wood rail and stile carriage-house doors which open transversely via side hinges. The manufacture of these high-end garage doors includes staining and sealing all wood portions to the elements such that once installed, the beauty of the wood is exposed to the exterior of the home, giving the home's garage door a vintage appearance.

Wooden carriage-style garage doors such as those disclosed by Jellá tend to be expensive to purchase and difficult to install. As such, they tend to not be an option if a homeowner wants to add a real wood appearance to an existing garage door. At the present time there is no option known to applicant that allows a homeowner to achieve the look of a wooden garage door other than the complete removal and replacement of an existing garage door. Not only is total replacement of an existing garage door expensive, but it often requires the additional expenses associated with upgrades to the structure's framing, track system, springs and electric opener to support the increased weight and thickness of the new garage door. Further, replacement of a metal garage door often requires the services of a contractor, with associated expenses. The bottom line is that garage door replacement may be too expensive for the average homeowner and outside the homeowner's normal skills, since most homeowners are not skilled in the art of garage door manufacture and installation.

The increasing popularity of carriage-house style garage doors is made apparent by the fact that garage door manufacturers such as Clopay Building Products R& D Company, Inc. (current website at www.clopaydoor.com) have recently begun producing overhead articulating-panel garage doors to include metal exterior panels into which patterns are permanently stamped that mimic the appearance and structure of rail and stile carriage-house doors. With these products, multiple decorative polystyrene overlay members are applied to the exterior portion of doors to give a three-dimensional appearance that closely simulates the structure of those vintage carriage-house doors. However for a user to upgrade to these doors they must purchase a completely new garage door and have their existing track system altered to accommodate the increased weight and thickness of that new garage door. Therefore this method is not an option for someone looking to embellish an already-existing garage door. Furthermore since these stamped panel garage doors are constructed of metal and polystyrene and primed to be painted once installed, there is no way to gain the appearance of a solid-wood carriage-house door through this method.

U.S. Pat. No. 6,148,896 to Pinto et al. provides a method to embellish a pre-manufactured multi-panel articulating overhead non-wood garage door so that the finished door has the appearance of a rail and stile door. In this patent, a plurality of extruded polystyrene members is overlaid onto to a garage door before initial installation in a design that is customizable by the end user. This method requires that the pre-manufactured garage door be placed in a jig which approximates the opening framed in the structure into which the door will be installed. The polystyrene members are permanently adhered to the exterior surface of the garage door then cut to allow the door's panels to articulate correctly. Modification of an existing garage door according to this patent is beyond the abilities of someone not skilled in garage door manufacture and installation. Moreover, modification of the door is performed prior to initial installation of the garage door, and therefore not intended to embellish a garage door which is already installed into a structure. Pinto's method creates a permanent bond between the overlay component and the underlying garage door, making the overlaid panels non-removable. And since the overlaid panels are polystyrene, the final finish would typically be paint and not solid wood. Pinto specifically calls out wood as an inadequate component of garage door overlays in general, which eliminates this method from use when one wishes to enhance their existing garage door to appear to be made from solid wood with a carriage-house style.

US Patent Application Publication No. US 2009/0107047 A1 filed by Magill et al. details a method wherein individual garage door panels are created using multiple metal skins. Pultruded fiber-reinforced thermoset material is adhered to the outer or inner skins (or both) of metal panels with a permanent adhesive that allows for the different thermal expansions of the disparate materials involved. While the adhesive method and design of the overlay panel are left undefined, this method is specific to the manufacture of garage doors prior to installation and does not provide for a method of overlaying a garage door that has already been installed in a structure. Furthermore, as before the use of a non-wood material for the overlay panel that is permanently bonded to the underlying panel excludes the product from use where the homeowner desires to embellish an already-installed garage door to appear as if it is a solid-wood, carriage-house styled door.

There is a need, therefore, for apparatus for upgrading and enhancing the appearance of existing metal garage doors, especially apparatus that may be installed by the typical homeowner without the complete removal and replacement of the existing garage door.

SUMMARY

The invention is defined by a plurality of lightweight panels designed to embellish and enhance the exterior of an overhead multi-panel metal articulating garage door that has already been installed into a structure. The panels are specifically designed so that they are easily installed by a user who has no particular mechanical or construction skills. Once the panels are installed the garage door will appear to be manufactured of solid wood and has a rail and stile carriage-house design. The panels are easily removed from the garage door to which they are installed, so the owner may adjust the panel positions and may change the look of the door by using different panels.

Each panel comprises a multi-layer laminated structure having an underlayment sheet that provides a relatively rigid structural backing, and which preferably is defined by an extruded rectangular polystyrene sheet that has opposed major surfaces. A thin wood veneer is adhesively bonded to the outer-facing major surface of the polystyrene sheet and the veneer includes plural vertical grooves to simulate the appearance of side-by-side tongue and groove boards. When multiple panels are installed the V-grooves align to give the appearance of elongate vertical boards. Vertical and horizontal members are placed at desired positions on the veneer—typically the vertical members are aligned along the side edges of the panel and the horizontal member extends across the middle of the panel. The vertical and horizontal members provide structural and visual characteristics and, like the polystyrene sheet, are covered with a thin skin of wood. Plural magnets are embedded into the side of the polystyrene backing sheet that faces the garage door and a layer of a high friction coating is applied over the entire rear surface of the backing sheet, including the magnets.

The outer or street-facing side of the panels is wood and the wood is finished and sealed to the elements to provide long-term protection from the weather that a typical garage door experiences. More specifically, a UV-cured polymer is applied to the wood, weather-facing surfaces for long life and attractive appearance.

Accordingly several objects and advantages of the invention include providing an easily-installable and removable garage door overlay for existing metallic garage doors that enhances the appearance of the door. The panels have a wood surface that may be finished according to the homeowner's preferences and the panels are lightweight and do not interfere with normal functioning of the garage door, or already-installed automatic opening mechanisms.

Yet another object of the invention is to provide an easily-adjustable and removable garage door overlay.

The invention provides a method for a user to install the panels to an existing, pre-installed metal overhead garage door to increase the curb-appeal of a structure by embellishing the structure's existing metal garage door. Accordingly, the invention provides a method for the user to increase the intrinsic value of the structure, provides a method for the user to customize the appearance of the overlaid door with an unlimited array of designs, provides a method that allows that existing metal garage door to continue to function as designed after installation of the overlaid panels with no adjustments or upgrades to the existing opening mechanisms necessary, provides a method of light transparency through certain alternate embodiment panels which complement existing garage door inset windows to allow light to continue to penetrate into the interior space of the enclosure, and provides a system of removable panels that the user can easily install onto and remove from an existing overhead multi-panel articulating metal garage door.

Still further objects and advantages will become apparent from review of the specification and drawings.

BRIEF DESCRIPTION OF THE DRAWINGS

The invention will be better understood and its numerous objects and advantages will be apparent by reference to the following detailed description of the invention when taken in conjunction with the following drawings in which:

FIG. 1 is a perspective left-side and partially exploded view of an individual overlay panel constructed in accordance with a first illustrated embodiment of the invention.

FIG. 1A is an exploded perspective view of vertical member of the overlay panel illustrated in FIG. 1.

FIG. 1B is an exploded perspective view of the transverse horizontal member of the overlay panel illustrated in FIG. 1.

In FIG. 9 the horizontal members of all panels have been altered and additional overlay components have been added to provide the finished door with a different design appearance.

DETAILED DESCRIPTION OF THE PREFERRED AND ILLUSTRATED EMBODIMENTS

Structure

Figure 2:
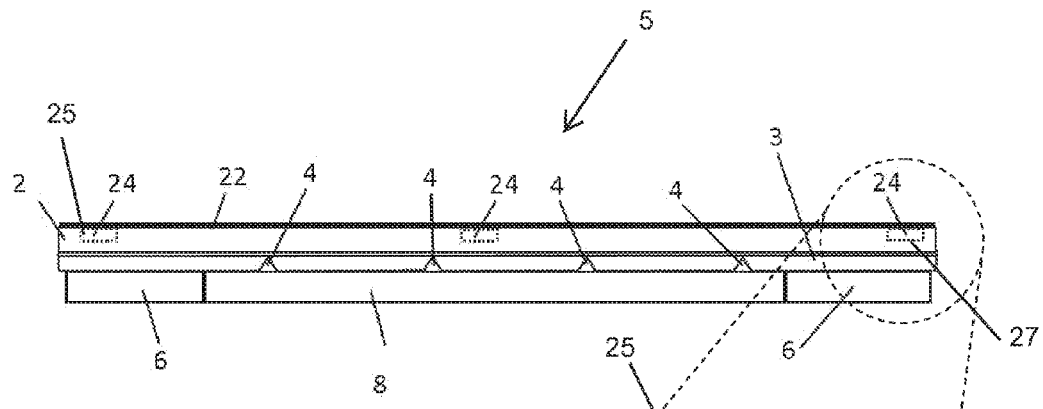
FIG. 2 is a top edge view of the individual overlay panel shown in FIG. 1.

The invention will now be described in detail with reference to the drawings. It will be understood that relative directional terms are used at times to describe components of the invention and relative positions of the parts. As a naming convention for the purposes of illustrating the invention, the ground plane is considered to be a generally horizontal surface such as a garage floor, although it will be appreciated that in practice not all garage floors are horizontal. Other relative directional terms correspond to this convention: "upper" refers to the direction above and away from the ground plane; "lower" is generally in the opposite direction, "inward" is the direction from the exterior toward the interior of the panels, "vertical" is the direction normal to the horizontal ground plane, and so on. The "street-facing" side of the panel, and similar descriptions, refers to the face of the panels that is visible to a passerby. The garage-door facing side of the panel is the face of the panel that when installed faces and abuts the pre-existing garage door.

Turning now to the figures, and particularly with respect to FIG. 1, a first preferred embodiment of an individual overlay panel 5 according to the present invention is shown in perspective view. The structure of the individual panel 5 will be described in detail initially. It will be appreciated that plural individual panels 5 are designed to be installed onto an existing overhead metal garage door to give the garage door the appearance of being manufactured entirely of wood in the rail and stile fashion. It will thus be apparent that the size of the individual panels 5 may be varied greatly in order according to the size of the existing garage door onto which the panels are to be installed, and according to other factors such as the particular appearance desired.

Overlay panel 5 is a multilayer member comprising an underlayment sheet 2 that provides a relatively rigid structural backing for the panel 5 and which preferably is defined by an extruded polystyrene sheet. While other materials may be substituted for the polystyrene sheet used to make underlayment sheet 2, it has been found that a polystyrene sheet approximately 0.25 inches thick provides a lightweight and sufficiently rigid backing that works well with the invention. Nonetheless, other materials such as conventional plywood may be used for the underlayment sheet 2. As noted above, the size of the individual panels 5 may vary according to the specifics of the particular installation. However, one typical size for the underlayment sheet 2 is about four feet in width with a height that matches the height of the individual panels on the existing multi-panel overhead metal door onto which the panels 5 are designed to be installed.

A thin wood veneer 3 is adhered to the outer-facing surface 7 of the underlayment sheet 2 with appropriate adhesives such as a two part epoxy. Since the veneer 3 is wood it has typical wood grain; the veneer 3 is oriented on the underlayment sheet 2 such that the grain of the wood is visible in the desired orientation to provide the desired visual impact; typically the grain of the wood is oriented to provide the appearance of vertically extending boards. The veneer 3 preferably covers the entire underlayment sheet 2.

The outer-facing surface of veneer 3—that is, the side of the veneer that is visible to a passerby—is scored with plural vertically extending V-grooves 4. The V-grooves 4 are in the embodiment of FIG. 1 parallel with the vertical side edges of the underlayment sheet 2. Typically, the V-grooves 4 are equally spaced apart across the width of the underlayment sheet 2 so that the scoring creates individual sections of equal width on the exterior face of the panel 5. This gives the appearance of individual dimensional wood boards that are vertically arranged and which have conjoined lateral side edges, for instance, in the fashion of tongue and groove boards, which is a characteristic of rail and stile construction. The vertically oriented grain of the wood used for veneer 3 contributes to the appearance of individual boards. As detailed below, a finish is applied to the exterior facing surface of the veneer 3. Preferably, the finish, which is identified generally in FIG. 1 with reference number 100, is a UV-cured polymer that functions to add desired color and finish to the veneer, protects the wood from the elements, and which also adds rigidity to the panel 5. Moreover, individual sections created by the V-grooves 4 may be finished with different coloration so that adjacent sections within a single panel 5 appear to be a different dimensional board. This appearance reinforces the illusion of carriage-door style construction.

With continuing reference to FIG. 1, panel 5 further comprises two vertically oriented members 6 that are attached to the opposed lateral edges of the panel 5 with the outer edges of the vertical members aligned with the side edges of the underlayment sheet 2 and veneer 3, and one horizontal member 8 that extends transversely between the vertical members 6. An individual vertical member 6 is shown in an exploded view in FIG. 1A and an individual horizontal member 8 is shown in an exploded view in FIG. 1B. Vertical members 6 are defined by a dimensional polystyrene board 10 which is of the type used for insulation panels and which is trimmed to a length which exactly matches the height of the underlayment sheet 2. The polystyrene board 10 defines a lightweight core material for the vertical and horizontal members 6 and 8. The width of board 10 is sized to approximate and simulate the width of the stile portion of rail and stile construction, which is approximately five and one-half inches in width. Polystyrene board 10 is very lightweight but gives a rigidity which provides a three-dimensionality quality to the panel 5; this is an essential visual element in carriage-style appearance. The upper and lower edges of polystyrene board 10 are beveled at an angle so that when two adjacent panels 5 are installed on adjacent panels of an existing garage door, the abutting vertical members 6 of one panel 5 create a plane scarf joint (see FIG. 5) with the aligned members 6 of the adjacent panel 5. The scarf joint minimizes the visual separation of the adjacent panels 5 and contributes to the appearance that these abutted vertical members 6 are actually one long vertical board and is defined by the flat plane sections of the respective vertical members meeting on an angle relative to the plane defined by the vertical members.

A thin skin of wood facing 14 is adhered to the outer major surface of board 10 with an appropriate adhesive such as two-part epoxy to create a permanent waterproof bond between the board 10 and the facing 14. Thin wood strips 12, commonly known as edge-banding, are adhered to the opposed side edges and beveled upper and lower edges of polystyrene board 10 with the same adhesive as used to bond facing 14. The wood strips 12 create the appearance that the vertical members 6 are actually a piece of solid dimensional wood. However, as noted, the members 6 are very lightweight.

The horizontal members 8 are constructed in a like manner to the vertical members 6. Specifically, as shown in FIG. 1B, horizontal member 8 has a core defined by a length of polystyrene board 10 and a wood facing 14 is adhered to the outer major surface of the board 10, and the upper and lower edges of the board 10 have edge-banding strips 12 bonded thereto. The opposed lateral side edges of board 10 do not have wood strips adhered to them because these edges abut the vertical members 6 in the assembled panel 5 and thus require no wood covering.

The wooden surfaces of both the vertical members 6 and horizontal members 8 is coated with the same UV coating that is applied to veneer 3.

Figure 7:
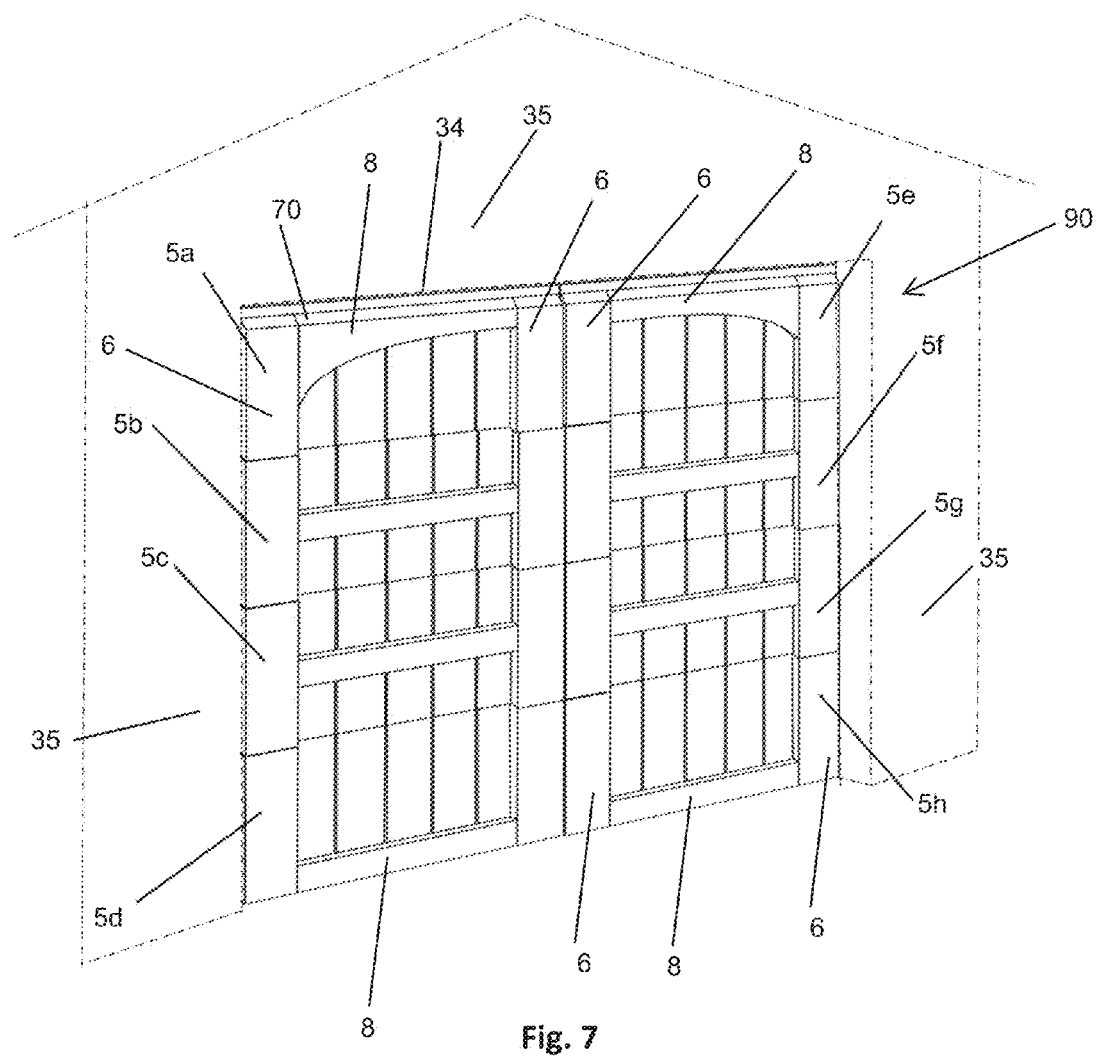
FIG. 7 is a view of the existing garage door of FIG. 6, but with the panels of the existing garage door obscured by plural overlay panels according to the present invention, and including alternate embodiments of some of the overlay panels that are installed in such a way as to provide a complete rail and stile carriage-house garage door overlay system.

Two vertical members 6 and at least one horizontal member 8 are adhered to the face of the veneer 3, which as noted defines the exterior-facing surface of the panel 5 and into which V-grooves 4 have been notched. The preferred adhesive for attaching the members 6 and 8 is a two-part epoxy because epoxy provides a permanent waterproof bond, although there are other adhesives known to those of skill in the art that will suffice. The vertical overlay members 6 are adhered to underlayment 2 in such a way that their longest axis is parallel to the V-grooves 4. The horizontal member 8 is attached to underlayment 2 with the longitudinal axis of the member transverse to the axis of the members 6 and with the opposite lateral edges of the member 8 abutting the opposed vertical members 6. In the embodiment illustrated in FIG. 1, horizontal member 8 is adhered to underlayment 2 such that it is equidistant from the upper and lower edges of underlayment panel 2. As will be apparent from the drawings, the location of the horizontal member 8 on a panel 5 may be varied in the vertical direction and the shape of the member 8 may be changed to change the appearance of the panel. For example, as illustrated in FIG. 7 the lowermost edge of horizontal member 8 is non-linear and curved to define an arch that provides the appearance of an arched header—the horizontal member 8 is moved vertically upward on the panel 5 so that the top edge of the horizontal member is aligned with the top edge of the panel. Similarly, the horizontal member 8 may be moved vertically downwardly on a panel 5 so that the lowermost (and in this case linear) edge of the horizontal member aligns with the lowermost edge of the panel and so that the horizontal member defines a footer board. And as will be described in respect of FIG. 9, the "horizontal member" 8 may also be disposed at an angle across the panel.

Figure 3:
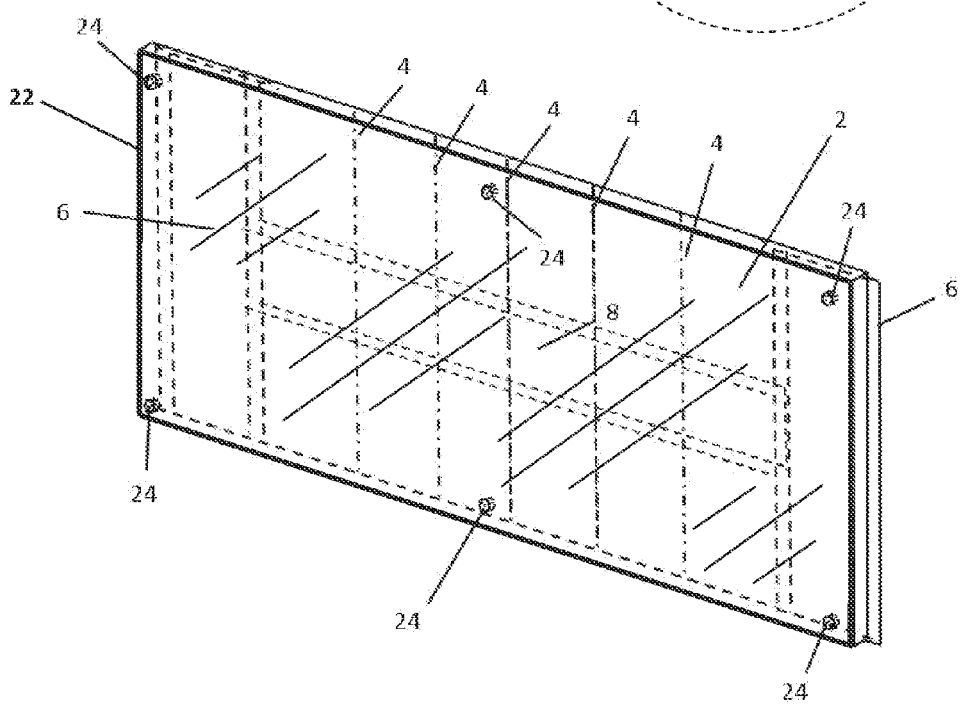
FIG. 3 is a perspective view of the back side of the individual overlay panel shown in FIG. 1.

As best illustrated in the views of FIGS. 2 and 3, plural magnets 24 are inset into receptacles formed in the polystyrene underlayment sheet 2. More specifically, plural blind bores 25 are formed in the rear surface 9 of sheet 2. A magnet 24 is inserted into each bore 25 and glued in place with an adhesive such as epoxy. The outermost surface of the magnets is coplanar with the rear surface 9. The panel 5 shown in FIG. 3 includes six magnets 24—one in each corner and two at near the middle of the panel and near the upper and lower edges, respectively. As detailed below, the magnets function to removably attach individual panels 5 to panels of the existing garage door. The placement and number of magnets 24 used in any particular panel 5 will depend on factors such as the size of the panel. At a minimum, a magnet will typically be place in each of the 4 corners of the underlayment sheet 2. However, additional magnets may be used.

As noted previously, the underlayment sheet is preferably about ¼ inches thick. The blind bores 25 are cylindrical bores of a specified depth that are formed in the underlayment sheet and which have a base 27 on which the inserted magnet lies. The magnets 24 are preferably completely encapsulated in adhesive and are glued to bases 27 of blind bores 25. The depth of the blind bores 25 is approximately equal to the thickness of the magnets 24. Accordingly, when a magnet glued into the blind bore, the outer exposed surface of the magnet is coplanar with surface 9 of sheet 2 (the adhesive coating on the exposed surface of the magnets is very thin so as to not impede the attraction of the magnet to the metal garage door). In a preferred embodiment the blind bore has a depth of about $\frac{1}{8}^{th}$ inch. This leaves about the same amount of polystyrene material at the base of the blind bore 25 and in this case the magnet would be about $\frac{1}{8}^{th}$ inch thick. The diameter of the blind bores 25 is very slightly greater than the diameter of the magnets 24 so that the magnets fit snugly into the bores and the adhesive on the magnets further adheres to the sides of the bores. It will be appreciated that the bores 25 and the magnets 24 may be other than circular and that any cooperative geometry between the magnet receptacle in the underlayment sheet 2 and the magnet 24 will suffice.

After the magnets have been glued in bores 25, an anti-skid coating 22 is applied over the entire inwardly-facing surface 9 of underlayment sheet 2. The preferred coating 22 comprises an elastomeric polymer coating of the type that is typically used for roof weatherproofing. There are several types of elastomeric coatings that are appropriate for use in forming the anti-skid coating 22. For example, butyl and silicone based elastomeric coatings provide excellent weather proofing qualities, and acrylic and polyurethane based coatings are also suitable. The elastomeric coating is applied as a liquid but when dry provides a high-friction surface yet remains flexible. The coating is applied over the entire surface and over the magnets 24. The coating defines a high-friction surface and contributes some rigidity to panel 5. As such, when the panel 5 is attached to a metal panel of an existing metal garage door (by virtue of magnets 24), relative movement between the panel 5 and the existing door is minimized in normal use. However, the panels 5 may be removed as needed since the magnets 24 releasably attach the panel 5 to the door.

The assembled panel 5 exhibits a high degree of rigidity with very little deformation over typically encountered temperature cycles.

Figure 2A:
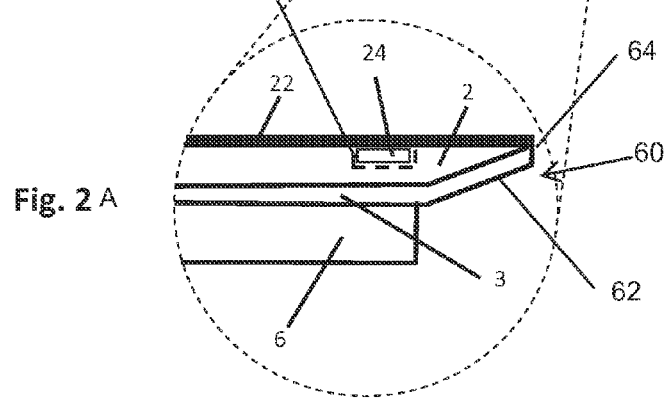
FIG. 2A is a call-out circle illustrating an alternative edge structure for the overlay panel, in which the outer edges of the component layers are tapered to allow for edge of the panel to lie beneath existing weather-stripping.

Reference is now made to FIG. 2A, which is a close up view of an alternative and optional edge structure for a panel 5. Specifically, the outer vertical edge identified generally in FIG. 2A with reference number 60 defines a sloped shoulder 62 in which both the underlayment sheet 2 and veneer 30 are tapered. In a garage door having plural panels 5 installed thereon, the outer vertical edge 60 is located on the opposite lateral sides of the garage door such that the side edges 64 of adjacent panels 5 are aligned with the sloped shoulder 62 positioned beneath existing weather-stripping that is attached to the framing of the structure surrounding the garage door opening. The opposite lateral edge of the panel 5 will be as shown in FIG. 2, that is, without the sloped shoulder 62.

Figure 4:
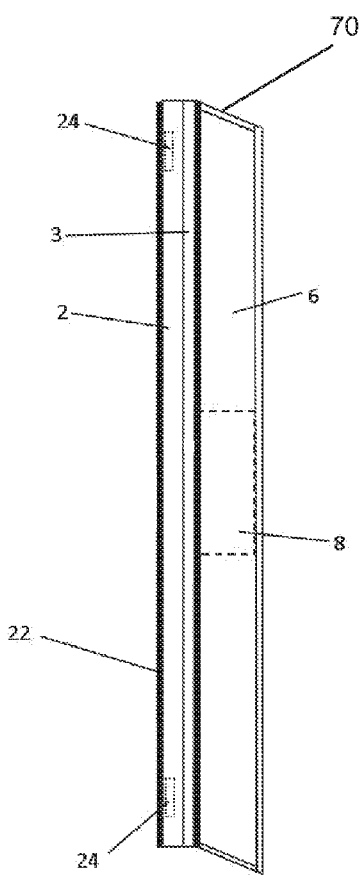
FIG. 4 is a side elevation view of one edge of the overlay panel illustrated in FIG. 1.
Figure 5:
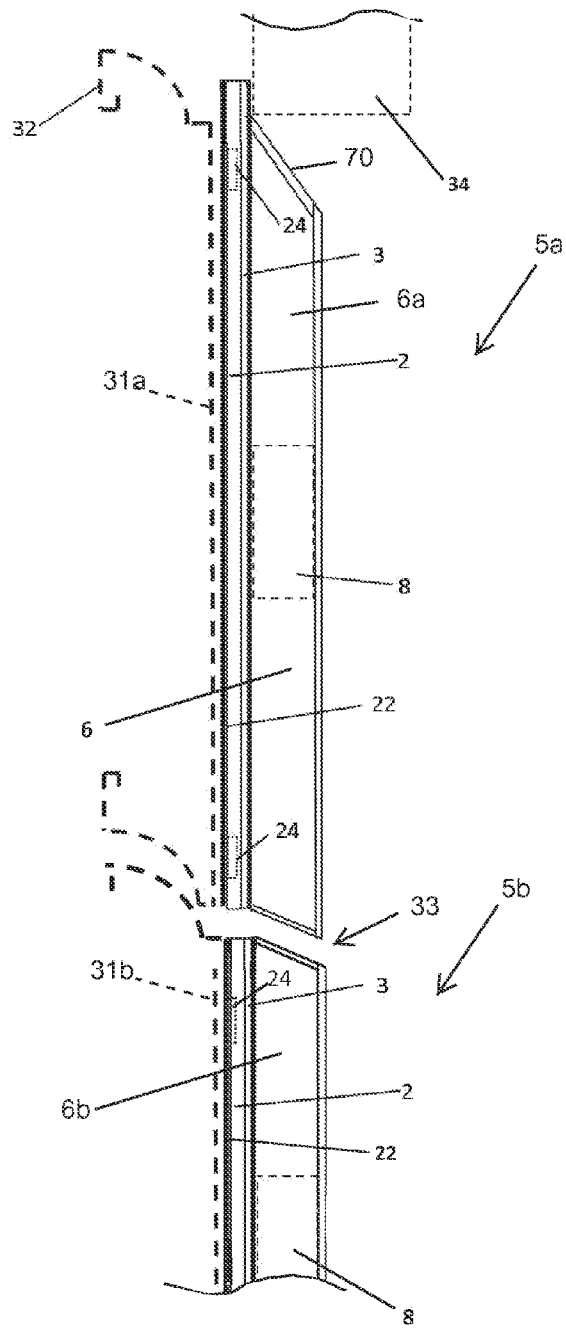
FIG. 5 is a side elevation view of two separate overlay panels arranged schematically to illustrate their juxtaposition when installed on an existing garage door, and showing the upper of the two panels having an alternate and tapered upper edge.

In FIGS. 4 and 5 it may be seen that the high friction coating 22 covers the magnets 24 and the entire surface 9 of sheet 2. Even though the coating 22 covers the magnets, the strong attractive force between the magnets 24 and the metal of garage door 32 is sufficient that the panel 5 is securely retained in place on the door 32. The dynamic force provided by the magnets 24 will cause the panels 5 to attach themselves to the metal garage door 32 so that in all normal use of the door—opening and closing—the panels 5 remain precisely positioned without relative movement between the door 32 and the panel 5. The high friction coating 22 assists in maintaining the position of the panel 5 on door 32. Nonetheless, the panel 5 may be adjusted by a user by pulling the panel away from the door, against the magnetic force, and repositioning the panel as desired.

FIG. 5 is a view of the side edges of the two uppermost panels 5a and 5b, attached to two corresponding metal panels of an existing garage door, identified in FIG. 5 with reference numbers 31a and 31b. The garage door 32 is shown in phantom lines. The door 32 is represented in the closed position; the header 34 of the garage door opening is a structural part of the framing of the house. It may be seen that the uppermost edge 70 of vertical member 6a on the uppermost panel 5a in FIG. 5 is beveled at a greater angle than the angle of the same edge 70 of vertical member 6b of panel 5b in FIG. 4. The reason for this modification of panel 5a is apparent: so that the panel 5a and its vertical member 6a clears header 34 as the garage door 32 is raised to the open position and lowered back to the closed position. Garage door 32 is a conventional garage door and may include an optional motorized opening mechanism (not shown). It is a property of garage doors 32 that when the opening mechanism begins the pulling action which causes the garage door 32 to rise vertically—moving from the closed toward the open position—that there is also a horizontal pulling force applied to the garage door 32 towards the interior of the enclosure. With the upper edge 70 beveled as shown in FIG. 5, the vertical member 6a of panel 5a passes under header 34 without interference. This action is repeated in a reverse direction when the garage door 32 is moved into the closed position. A panel 5 that is intended to be placed uppermost in the overall system design, such as panel 5a in FIG. 5, will be constructed with this modification to the upper edge 70 of members 6 to ensure unimpeded operation of the existing garage door 32.

FIG. 5 also shows the vertical alignment of a panel 5a and a vertically adjacent panel 5b such that when the two panels are abutted in a vertical arrangement and installed onto the panels of an existing garage door 32, a scarf joint 33 is formed between the two panels 5a and 5b such that a weather barrier is provided and a visual conjoining of the two upright members 6 (i.e., 6a and 6b) of each panel is also provided. The scarf joint significantly diminishes the appearance that there are separate panels when the garage door is closed. When installing panels 5 of any of the various embodiments described herein, the scarf joint 33 is repeated vertically over the entire surface of the existing garage door 32 and there is left an appearance that the vertical members 6 extend upwards as one board of dimensional lumber throughout the entire garage door overlay system, as seen in FIG. 7.

Figure 6:
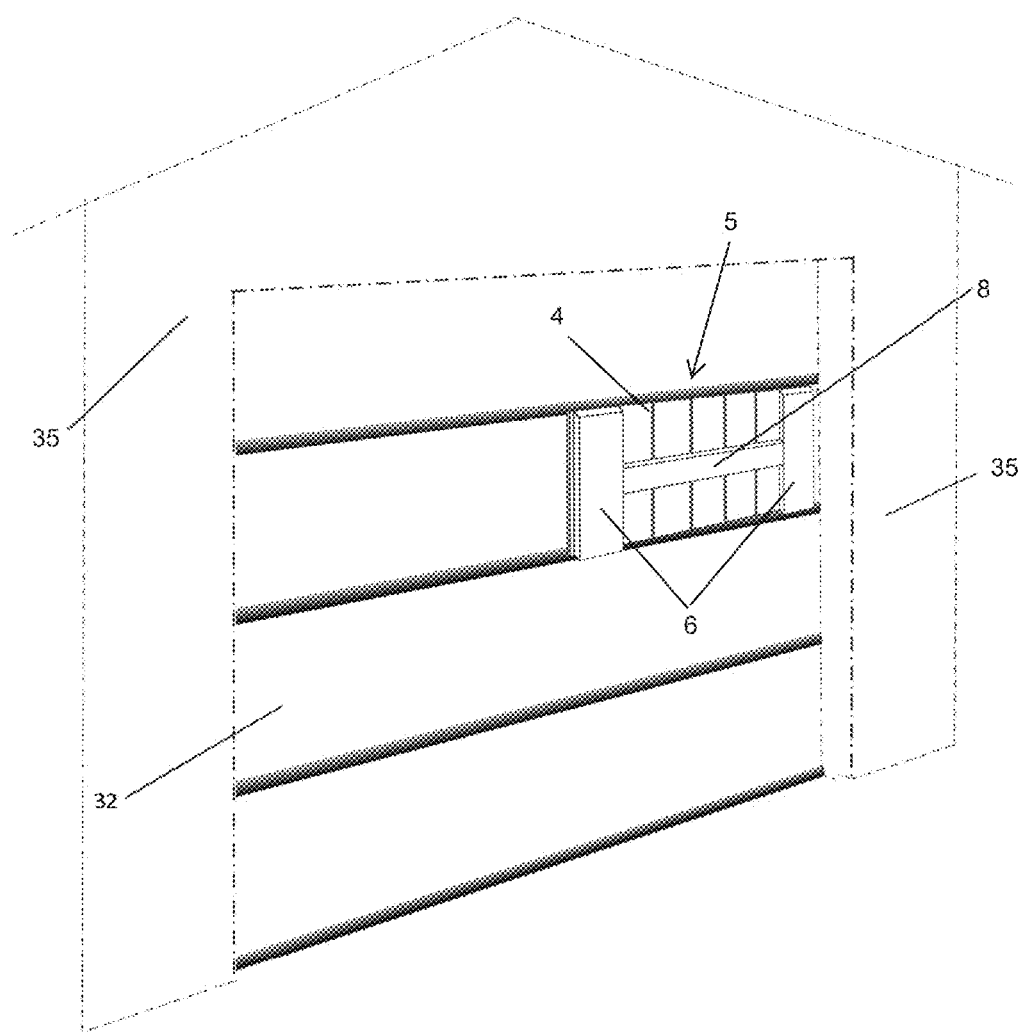
FIG. 6 is a perspective view of the single overlay panel shown in FIG. 1 attached to a panel of an existing overhead metal multi-panel articulating garage door. The phantom lines in FIG. 6 illustrate a typical garage door opening in a structure such as a house.

FIG. 6 illustrates a single panel 5 as it is intended to be installed onto an existing garage door 32 that has been previously installed into a structure 35. Panel 5 has been adhered to garage door 32 via magnetic force from the magnets 24. While placement of individual panels 5 is dictated from the overall panel system design, each panel 5 will be installed such that the uppermost edge of each panel is aligned with and parallel to the uppermost edge of the individual panels of garage door to which panels 5 are attached. The panels 5 are installed such that the longest axis of the panels is exactly parallel with the longest axis of the individual panel of the garage door 32.

FIG. 7 shows a plurality of panels 5 installed on an existing overhead metal multi-panel articulating garage door (the garage door is hidden by the panels 5) which has been previously installed into a structure 35. For reference purposes, a finished installation as illustrated in FIG. 7 with a plurality of panels 5 is referred to as installation 90. The installation 90 shown in FIG. 7 includes eight separate panels 5, numbered 5a, 5b, 5c and so on through 5h. Panels 5a and 5e are attached to the uppermost panel of the underlying garage door and in the case of panels 5a and 5b; the horizontal members 8 have been resized and repositioned to conform to the overall system design. The horizontal members of the other panels 5 are modified as well, as may be seen in the drawing.

Specifically, as noted above, the horizontal members 8 may be located in varying positions on the veneer 3 and in the case of FIG. 7, the members 8 on panels 5a and 5b are moved upwardly so that they take on the appearance of a header board at the top of the door. Moreover, the horizontal members 8 on panels 5a and 5e in concert define an arched shape so that the paired aligned members simulate an arch extending across the top of the installation 90. Horizontal members 8 on panels 5d and 5h have been moved downwardly on the respective panels so that in concert they provide the appearance of a footer board. With the ability to alter the location of horizontal members 8, numerous different designs may be achieved, including arches, angles, etc. to change the overall architectural appearance of the installation. Should the system design dictate that the horizontal member 8 adjoin an abutting panel's horizontal member 8 in any way such as occurs in the vertically adjacent panels in FIG. 9 (where the horizontal members are at angles on the panels and the members abut one another), the edges of the members 8 which will adjoin will each be covered in edge-banding 12 such that there is never any of the polystyrene 10 visible or exposed to the elements when the garage door 32 is opened or closed.

Continuing the description of FIG. 7 for illustration purposes the eight panels 5 are sized appropriately for a garage door that is an eight-foot wide single-car garage door and requires a width of two panels 5 side by side to completely cover the door. Also for illustration purposes, the garage door rough opening is about seven feet in height and the existing garage door is constructed of 4 identical panels stacked vertically onto each other to form a protective curtain. This size is typical for standard metal overhead hinged garage doors used in modern construction of residential garage doors. The panels 5 may be sized according to the garage door onto which the panels will be installed. While not shown in the drawings, those of skill in the art will appreciate that garage doors that are formed of 5 identical stacked metal panels to define a height of roughly eight feet is also a standard of modern garage door construction. Such a standard door can be embellished equally with panels 5 as well as the four-panel garage doors 32 shown in FIG. 6. The user would simply utilize panels with a height that matches the height of the individual garage door panels onto which the panels 5 are being installed. Those of ordinary skill will recognize that these variations in sizing and design can be accomplished with no limits to the design of panels 5 except for sizing differences and the number of panels 5 utilized.

Figure 8:
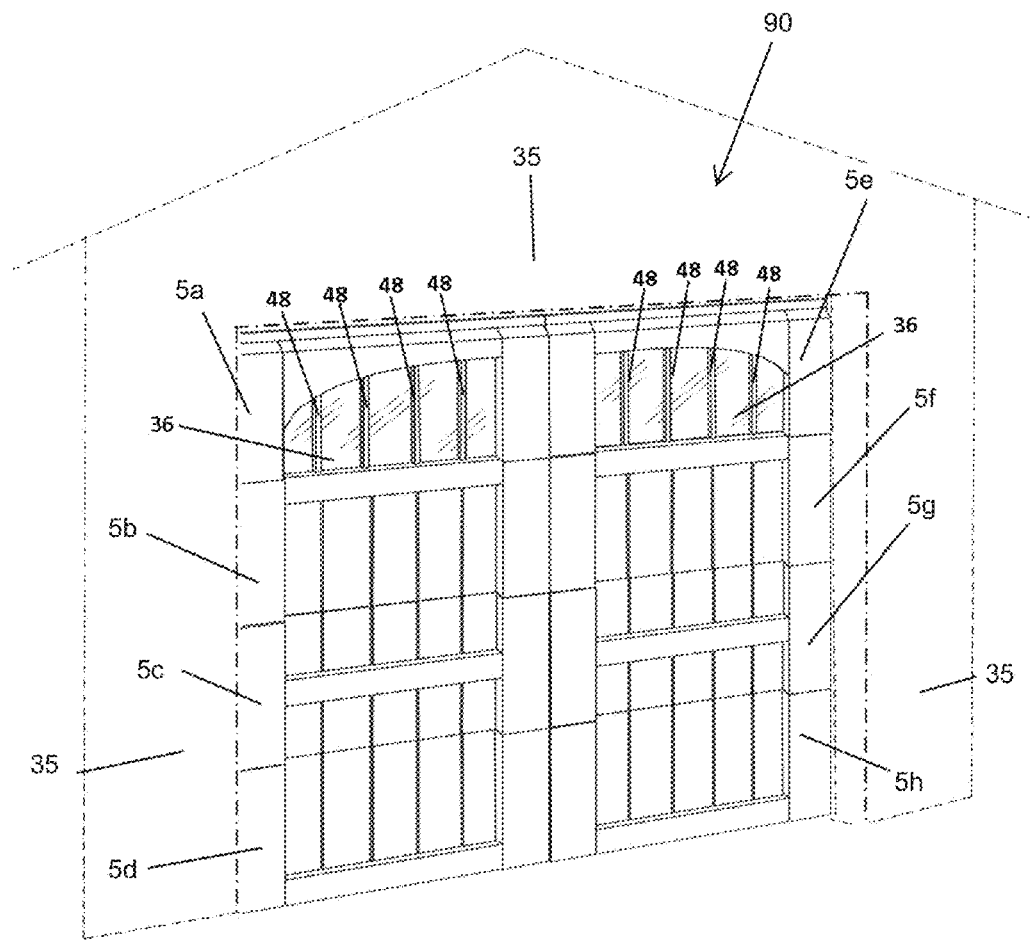
FIG. 8 is a perspective view similar to the view of FIG. 7 except illustrating an alternate embodiment of the invention wherein some of the overlay panels according to the invention include clear polycarbonate sheeting to simulated window appearance.

FIG. 8 shows a finished installation 90 in which the uppermost panels (5a and 5e) are modified to show yet another alternative embodiment of the panels; in this case, the panels 5a and 5e incorporate a structural features that mimics the appearance of windows. Specifically, a clear polycarbonate sheet 36 has been substituted for underlayment sheet 2—the sheet 36 is of the same thickness and size as underlayment sheet 2 and the magnets are installed in the rearward-facing surface of the polycarbonate sheet in same manner as described above with respect to the analogous underlayment sheet 2. Moreover, the horizontal members 8 of panels 5a and 5d are arranged similar to those shown in FIG. 7 and include vertical members 48 that overly the polycarbonate sheet 36 to provide the appearance that panels 5a and 5d have windows that are separate equally-sized panes of glass inset into the panel. The coating 22 is omitted on panels 5 that have the clear polycarbonate sheet 36 in place of the underlayment sheet 2.

Figure 8A:
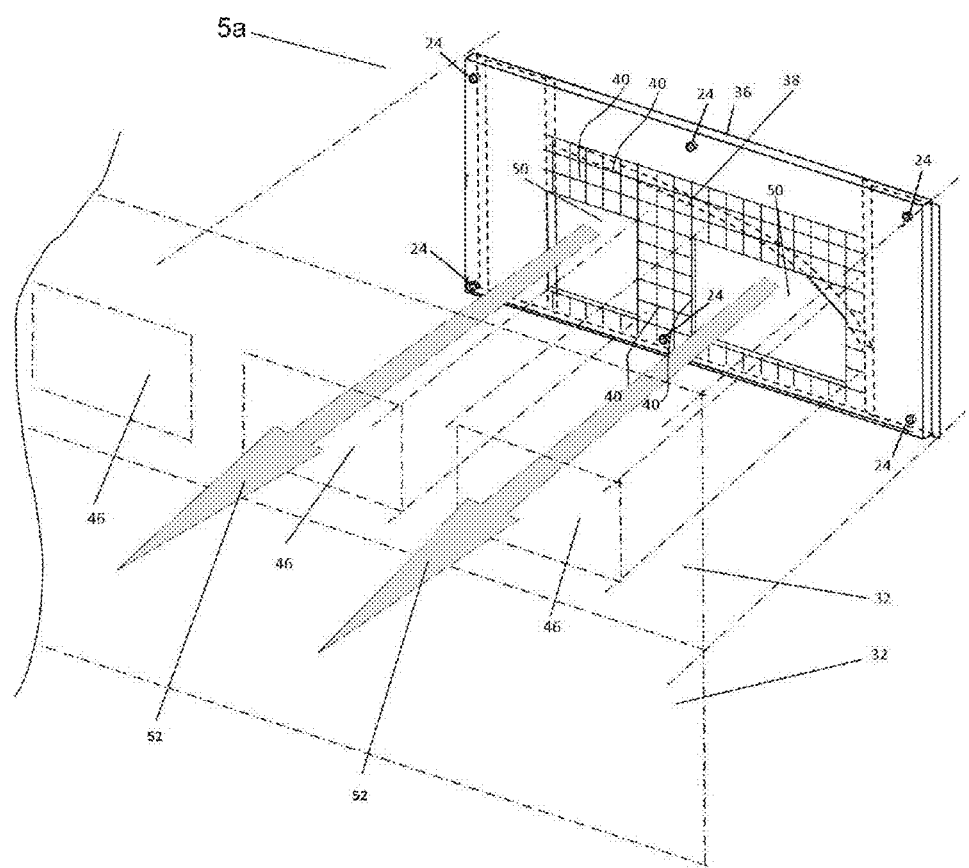
FIG. 8A is a perspective view the back side of the an individual overlay panel constructed according to the alternate embodiment shown in FIG. 8, detailing the construction of the overlay panels that include clear polycarbonate sheeting.

FIG. 8A shows a rear perspective view panel 5a shown in FIG. 8. As noted, in this embodiment the underlayment sheet 2 described in respect of prior embodiments is replaced with a sheet of clear polycarbonate that has the same dimensions as sheet 2. A layer of black, opaque, single-sided adhesive vinyl tape 38 is adhered to the rear face of polycarbonate sheet 36. When the panel is viewed from the street side, the black tape 38 is visible through the clear polycarbonate and provides the appearance that the panel includes panes of clear glass, even though the garage door on which the panel 5a is adhered does not have any windows.

The tape 38 is preferably pre-scored at lines 40 to separate the tape into small squares such that each square is individually removable. When the garage door 32 is of the type that has windows, portions of the tape 38 may be removed from the panels 5 where the panel overlays the windows in the garage door. FIG. 8A shows several of these small sections of tape 38 removed to create the areas 50 which approximate the planar glazed surface of the existing windows 46 of garage door 32, again in the case where the door has windows such as windows 46 shown in phantom lines. The transparency of the exposed areas 50 after the removal of sections of tape 38 allows light 52 to penetrate from the exterior through the panel and into the interior of the garage. The customizable quality of alternate embodiment of panel 5a allows the user to retain the functionality of the existing garage door's inset windows while completing the overall carriage-house appearance provided by the panels 5. Should the garage door 32 on which the panels are being applied be constructed of all solid panels with no windows, the user will simply leave the vinyl one-sided tape 38 of intact and retain the appearance from the exterior that the garage door has window panes as part of its carriage-style construction.

Figure 9:
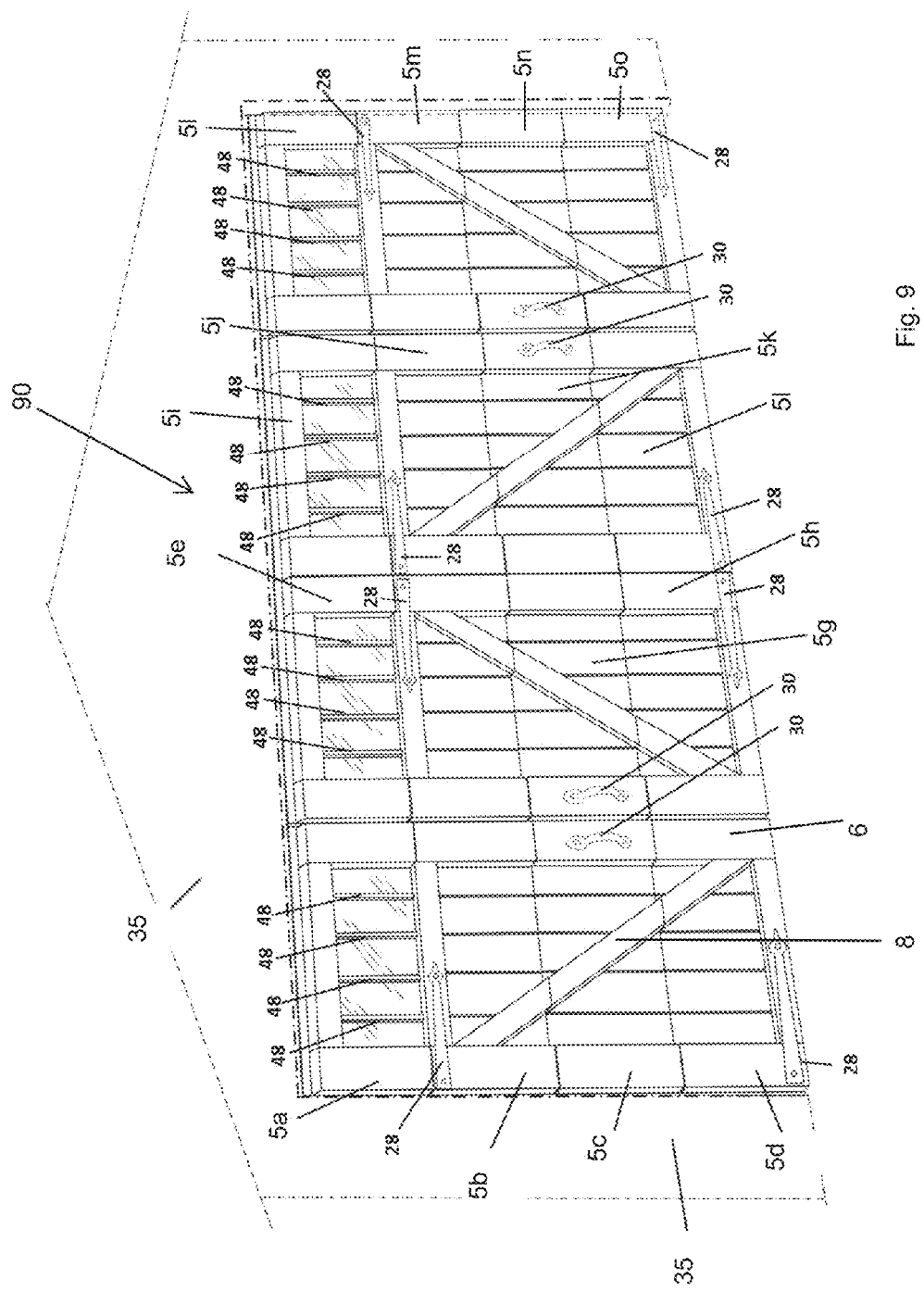
FIG. 9 is a perspective view of a garage door that has plural overlay panels according to the invention installed.

FIG. 9 shows a finished installation 90 having plurality of panels 5a through 5o in which the horizontal members 8 have been altered on all panels to provide a differently-designed appearance. While they are not part of the invention, FIG. 9 also shows decorative hinges 28 and handles 30, which have been included in the drawing to complete the overall carriage-house style. As can be seen in FIG. 9 the angle of horizontal members 8 has been altered such that the members are displaced at an angle across the combined panels, providing a dramatically different appearance while maintaining the basic construction and adherence methods detailed in this application.

For illustration purposes and to show a variety of different uses of the invention defined herein, FIG. 9 shows a typical two-car overhead garage door that is typically about 16 feet in width and which has been embellished with plural panels 5 according to the invention. The garage door shown in FIG. 9 is a standard garage door construction and from examining the illustration it will be clear that to install panels 5 on a two-car garage door the user would simply use two sets of panels 5 that are designed for an eight-foot wide single-car garage door. The modularity of the panels 5 described herein can be carried further to install the panels onto a variety of garage doors with different sizes and styles, for example, doors that are installed into a three-car garage and which are roughly twenty four feet in width.

Installation and Operation

The panels 5 described above are very simple to install on an existing metal overhead garage door because the panels are magnetically attached directly onto cooperatively sized garage door panels. The panels 5 are sized according to the size of the garage door and the user specifies the appearance of the finished installation that is desired.

With the appropriate number of panels 5 ready to be used and with the existing garage door in the closed position, the user positions a panel 5 over the corresponding garage door panel. Typically, the installation will start with a panel 5 being installed in either the right or left hand lower edge. When the panel 5 is brought in close proximity to the metal panel the magnetic force provided by magnets 24 draws the panel 5 onto the garage door panel. The panel 5 must be aligned so that its edges are aligned with and parallel to the edges of the underlying garage door panel edges, but this is a simple operation because the magnets 24 allow for relatively easy repositioning (and removal). With the first panel 5 aligned and properly installed the remainder of the panels 5 are then installed in this same manner. It will be appreciated that where the outer lateral edges 60 of the panels 5 incorporate the sloping shoulder 62 illustrated in the alternative embodiment of FIG. 2A, it is necessary to open the garage door 32 slightly to separate the door from the weather stripping in order to install the panels with the edge 60 underneath the weather stripping.

It should be noted that while certain combinations of vertical overlay members 6 and horizontal overlay members 8 are shown for illustrative purposes, alternate locations and sizes of the horizontal members are anticipated and should be apparent to those skilled in the art. Moreover, those of skill in the art will recognize that certain alterations may be made while still retaining the equivalent panel. For example, the V-grooves 4 may be replaced with other types of demarcations that simulate side-by-side boards, including painted vertical lines on the veneer 3.

While the present invention has been described in terms of a preferred embodiment, it will be appreciated by one of ordinary skill that the spirit and scope of the invention is not limited to those embodiments, but extend to the various modifications and equivalents as defined in the appended claims.

The invention claimed is:

1. An overlay panel for removable attachment to a panel of an existing metal garage door, comprising:
   a rigid backing sheet having opposed first and second planar major surfaces, opposed top and bottom edges and opposed side edges, said backing sheet having plural blind bores formed in the second major surface;
   a wood veneer adhered to the first major surface of the backing sheet and sized so that the wood veneer covers the entire first major surface, said wood veneer having plural spaced apart demarcations extending between top and bottom edges of said wood veneer;
   first and second vertical members adhered to the wood veneer and aligned with the opposed side edges;
   plural magnets in the blind bores, each magnet having an outer surface that is substantially coplanar with the plane of the second major surface; and
   a high-friction coating on the second major surface.

2. The overlay panel according to claim 1 further including a horizontal member extending between the first and second vertical members.

3. The overlay panel according to claim 2 wherein the horizontal and vertical members comprise wood surfaces.

4. The overlay panel according to claim 3 wherein the horizontal and vertical members comprise a lightweight core material covered with a skin of wood.

5. The overlay panel according to claim 4 wherein the horizontal member has one edge that is aligned with a top or bottom edge of the veneer.

6. The overlay panel according to claim 5 wherein the horizontal member has one edge that is aligned with the top edge of the veneer and an opposite edge that defines a curve.

7. The overlay panel according to claim 6 wherein the one edge of the horizontal member that is aligned with the top edge of the veneer defines an angled surface relative to the plane of the first major surface.

8. The overlay panel according to claim 4 in which the lightweight core material of the horizontal and vertical members comprises polystyrene board and the backing sheet is defined by an extruded polystyrene sheet.

9. The overlay panel according to claim 8 further including a UV cured polymer on the veneer and the horizontal and vertical members.

10. The overlay panel according to claim 1 wherein the backing sheet defines a rectangle having four corners, each corner defined by the intersection of adjacent edges of said rectangle, and wherein there are four magnets, one near each of the four corners of the backing sheet.

11. The overlay panel according to claim 10 further comprising additional magnets at predetermined positions in the backing sheet.

12. The overlay panel according to claim 11 wherein the high-friction coating covers the entire second major surface and the magnets.

13. The overlay panel according to claim 1 in which the plural spaced apart demarcations are defined by grooves formed in the veneer.

14. The overlay panel according to claim 13 wherein the overlay panel defines a first overlay panel, and the first overlay panel in combination with at least a second overlay panel oriented vertically adjacent said first overlay panel, said second overlay panel having plural spaced apart grooves and wherein the spaced apart grooves in the first overlay panel align with the spaced apart grooves in the second overlay panel.

15. An overlay panel for removable attachment to a panel of an existing metal garage door, comprising:
- a rigid rectangular polystyrene backing sheet having opposed first and second planar major surfaces, opposed top and bottom edges and opposed side edges, said polystyrene backing sheet having plural receptacles formed in the second major surface with at least one of said receptacles in each of the four corners of the polystyrene backing sheet;
- a magnet in at least each of the receptacles in each of the four corners;
- a wood veneer on the first major surface of the polystyrene backing sheet and sized so that the wood veneer covers the entire first major surface, said wood veneer having plural spaced apart grooves extending between the top and bottom edges of the veneer;
- first and second vertical members adhered to the wood veneer and aligned with opposed side edges of the veneer and the polystyrene backing sheet, the vertical members defined by a polystyrene core and wood outer surfaces; and
- a horizontal member extending between the first and second vertical members.

16. The overlay panel according to claim 15 wherein the overlay panel defines a first overlay panel, and the first overlay panel is in combination with at least a second overlay panel oriented vertically adjacent said first overlay panel such that the plural spaced apart grooves in the first overlay panel align with plural spaced apart grooves in the second overlay panel.

17. The overlay panel according to claim 16 wherein the first and second vertical members of the first overlay panel align with the first and second vertical members of the second overlay panel and define a plane scarf joint therebetween.

18. The overlay panel according to claim 15 wherein the horizontal member has one edge aligned with an upper edge of the polystyrene backing sheet and the veneer.

19. An overlay panel for removable attachment to a panel of an existing metal garage door, comprising:
- a rectangular, rigid and clear backing sheet having four corners and opposed first and second planar major surfaces, opposed top and bottom edges and opposed side edges, said clear backing sheet having plural receptacles formed in the second major surface with at least one of said receptacles in each of the four corners of the clear backing sheet;
- a magnet in at least each of the receptacles in each of the four corners, each magnet having an exposed surface that is coplanar with the plane of the second major surface;
- first and second vertical members adhered to the first major surface of the clear backing sheet and aligned with opposed side edges of the clear backing sheet;
- a horizontal member adhered to the first major surface of the clear backing sheet and aligned with the top edge thereof, said horizontal member extending between the first and second vertical members;
- wherein said first and second vertical members and said horizontal member in combination cover less than all of said clear backing sheet to define a window opening where said first and second vertical members and said horizontal member do not cover said clear backing sheet and wherein said magnets are positioned behind said vertical members; and
- an opaque sheet on the second major surface covering said window opening.

20. The overlay panel according to claim 19 wherein the opaque sheet is defined by a single-sided adhesive tape, and wherein portions of the opaque sheet are selectively removable from the second major surface so that the portions that are removed overlie a pre-existing window in the pre-existing door.

* * * * *